United States Patent [19]
Abst et al.

[11] Patent Number: 5,339,075
[45] Date of Patent: Aug. 16, 1994

[54] VEHICULAR COLLISION AVOIDANCE APPARATUS

[75] Inventors: Terrill Abst, P.O. Box 1902, Modesto, Calif. 95353; Don H. Keilen, San Jose, Calif.

[73] Assignee: Terrill Abst, Modesto, Calif.

[21] Appl. No.: 982,076

[22] Filed: Nov. 24, 1992

[51] Int. Cl.$^5$ .............................................. G08G 1/16
[52] U.S. Cl. ..................... 340/903; 340/904; 340/942; 340/936; 340/556; 180/169; 367/909; 342/70
[58] Field of Search ............. 340/903, 904, 933, 942, 340/943, 436, 554, 556, 557; 180/169; 367/909; 342/70, 129, 146

[56] References Cited

U.S. PATENT DOCUMENTS

| | | |
|---|---|---|
| 3,662,328 | 5/1972 | Spivak . |
| 3,874,475 | 4/1975 | Permut et al. ...................... 340/903 |
| 3,892,483 | 7/1975 | Saufferer . |
| 4,251,797 | 2/1981 | Bragas et al. ...................... 340/905 |
| 4,549,181 | 10/1985 | Tachibana . |
| 4,626,850 | 12/1986 | Chey . |
| 4,703,429 | 10/1987 | Sakata ................................ 364/426 |
| 4,716,298 | 12/1987 | Etoh .................................. 250/561 |
| 4,766,421 | 8/1988 | Beggs . |
| 4,833,469 | 5/1989 | David . |
| 4,849,731 | 7/1989 | Melocik . |
| 4,926,170 | 5/1990 | Beggs et al. ...................... 340/904 |
| 4,964,295 | 10/1990 | Miller . |
| 5,028,920 | 7/1991 | Dombronski ..................... 540/435 |
| 5,122,796 | 6/1992 | Beggs et al. ...................... 340/904 |
| 5,173,881 | 12/1992 | Sindle .............................. 340/903 |
| 5,235,316 | 8/1993 | Qualizza ........................... 340/436 |

*Primary Examiner*—John K. Peng
*Assistant Examiner*—Nina Tong
*Attorney, Agent, or Firm*—John P. O'Banion

[57] ABSTRACT

An apparatus for alerting the driver of a vehicle to the presence of another vehicle in an adjacent lane while changing lanes, in which an ultrasonic transmitter emits acoustic energy which, if reflected from an adjacent vehicle within a zone of coverage, is received on an ultrasonic receiver and processed to produce an audible warning to the driver indicative of the relative speed and position of the adjacent vehicle. One of three distinct audible warning tones alerts the driver to an approaching vehicle, a receding vehicle, or a vehicle whose relative speed is the same.

14 Claims, 6 Drawing Sheets

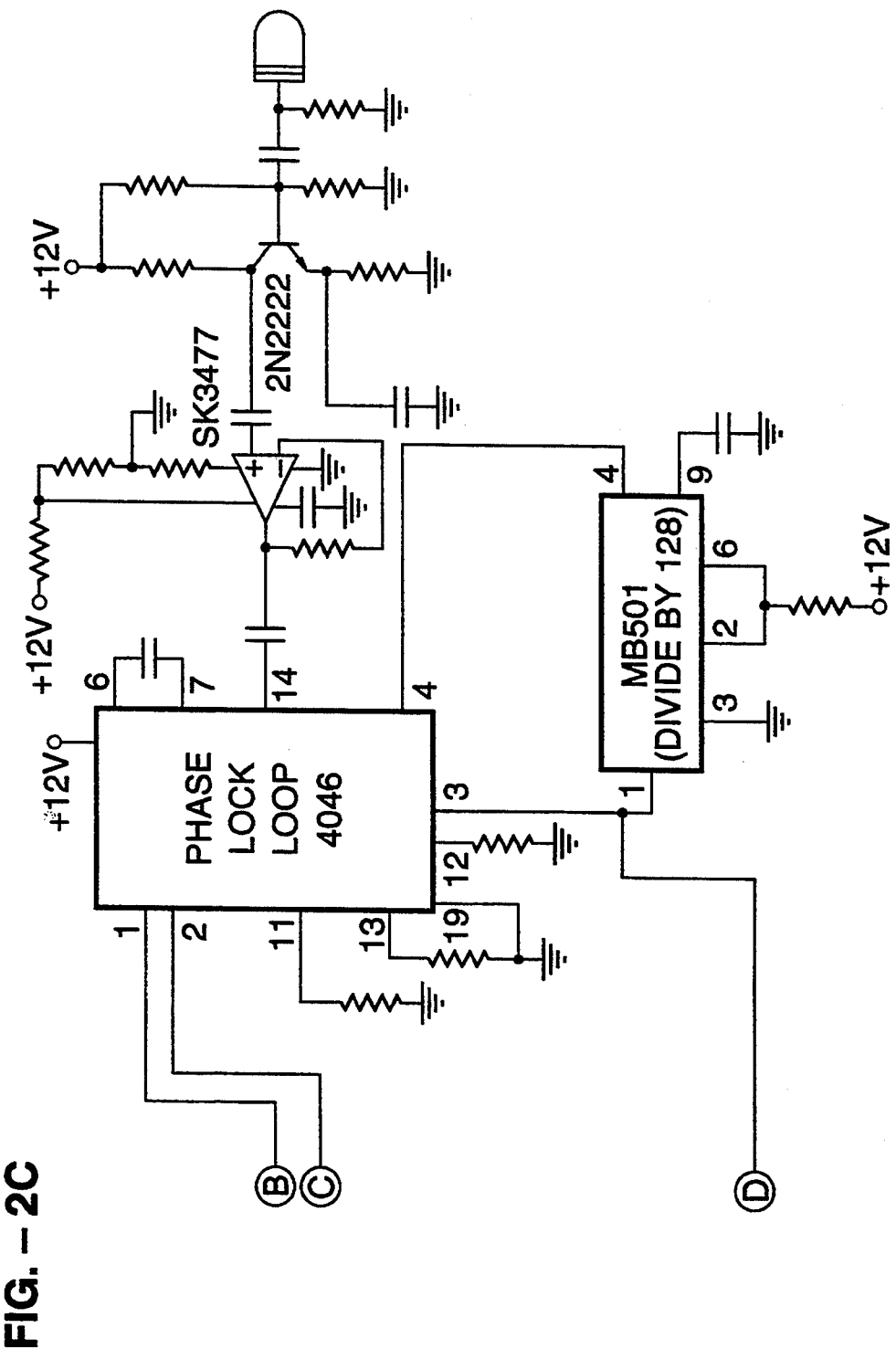
FIG. —2C

VEHICULAR COLLISION AVOIDANCE APPARATUS

BACKGROUND OF THE INVENTION

1. Field of the Invention

This invention pertains generally to collision avoidance devices for motor vehicles, and more particularly to an apparatus for alerting the driver of a vehicle to the presence of an adjacent vehicle while changing lanes.

2. Description of the Background Art

Knowing the position of other vehicles while driving is often a difficult and inexact operation. So-called "blind spots" exist which can make lane changing operations dangerous if vehicles in adjacent lanes within a critical distance are not detected. In many circumstances drivers "cut off" an adjacent vehicle or otherwise impinge on the right-of-way of the vehicle. Collision, serious bodily injury, or death can occur as a result.

Rear view mirrors have historically been used by a driver in order to determine if the vehicle's path is clear prior to changing lanes, and every person who has ever driven a motor vehicle has, at one time or another, failed to clear his or her blind spot through proper head turning. This is a particular problem for individuals who have a limited range of motion.

Various technological developments have resulted from the need to detect an obstacle in a vehicle's path. For example, U.S. Pat. No. 4,849,731 issued to Melocik on Jul. 18, 1989, discloses a scanning obstacle detection apparatus using a transducer which produces radiant energy and a rotatable reflector which projects the radiant energy outward and redirects reflected energy to the transducer; U.S. Pat. No. 4,766,421 issued to Beggs et al. on Aug. 23, 1988, discloses an object detection apparatus employing electro-optic emitters and detectors; U.S. Pat. No. 4,694,295 issued to Miller et al. on Sep. 15, 1987 discloses a vehicle blind spot detector using infrared and ultrasonic emitters and detectors to indicate the presence of another vehicle and its distance; U.S. Pat. No. 4,626,850 issued to Chey on Dec. 2, 1986, discloses a vehicle detection and collision avoidance apparatus having an acoustic ranging device to detect the presence of other vehicles to the rear of and adjacent to the user's vehicle; and U.S. Pat. No. 3,892,483 issued to Saufferer on Jul. 1, 1975, discloses a distance warning device for vehicles using rearward directed transmitters and a receiver mounted on the front of the vehicle. These devices are deficient, however, in that they not only detect vehicles, but other objects that are in the path of the transmitting and receiving devices.

To further discriminate between vehicles and non-vehicular objects, other devices have employed doppler technology. For example, U.S. Pat. No. 3,662,328 issued to Spivak on May 9, 1972, discloses an apparatus for determining the proximity of moving vehicles using an ultrasonic signal with a frequency proportional to the speed of the transmitting vehicle; U.S. Pat. No. 4,549,181 issued to Tachibana et al. on Oct. 22, 1985, discloses an moving obstacle detection system for a vehicle using a doppler radar device to inform the driver that another vehicle approaches or moves away from the detecting vehicle so that a pedestrian or another vehicle transversing the front of the vehicle is not erroneously detected; and U.S. Pat. No. 4,833,469 issued to David on May 23, 1989, discloses an obstacle proximity detector for moving vehicles and method for use thereof in which an alarm signal is generated when the combination of differential velocity and separation distance between the vehicle and an obstacle reaches an unsafe level. These devices, however, do not screen out objects that are receding above a preset velocity so as to eliminate false signals and ensure detection only of those vehicles which are overtaking, matching the speed of, or receding from the driver's vehicle. As a result, the devices in the foregoing patents could provide false indications of the presence of obstacles. Furthermore, these devices will detect all objects within their range of view regardless of the comparative speed in relation to the driver's vehicle.

Devices heretofore developed for alerting a driver to the presence of an obstacle will alarm from traffic signs, pedestrian benches, and other stationary objects alongside the turning vehicle. A high rate of false alarms renders these devices unusable. Therefore, a need exists for a device which will not only alert the driver of the presence of other vehicles when changing lanes, but alert the driver as to whether the adjacent vehicle is overtaking, matching the speed of, or receding from the driver's vehicle. The present invention satisfies that need.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention generally comprises a device which alerts the driver of a vehicle when there is a threat of changing lanes into the path of another vehicle. The device, which is activated by the turn signal indicator control of the host vehicle, emits an audible warning signal with a frequency related to degree of threat from the vehicle which is an obstacle.

If no tone is emitted from the device, then the adjacent lane is clear or is occupied by a vehicle which is receding at a sufficiently high speed so as not to pose a threat of collision. In other words, there is not an adjacent vehicle hidden in the "blind spot" of the host vehicle. When a vehicle is in an adjacent lane but moving at a constant speed in relation to the host vehicle, a 1000 Hertz tone is emitted. This tone warns the driver of the host vehicle that there is an adjacent vehicle in the "blind spot" of the host vehicle and the relative positions of the two vehicles are remaining the same. If the adjacent vehicle is approaching the host vehicle, a 1200 Hertz tone is emitted to indicate a high threat of collision; if the adjacent vehicle is receding from the host vehicle at a relative speed of less than five miles per hour, an 800 Hertz tone is emitted to indicate a low threat of collision.

The use of a high frequency tone—high threat; moderate frequency tone—moderate threat; and low frequency tone—low threat provides the driver of the host vehicle with a clear and readily understandable indication of the nature of the impending danger.

Because a receding vehicle poses a low threat of collision, a further feature of the device is to disable the warning tone when the adjacent vehicle is receding from the host vehicle at speeds in excess than five miles per hour. When the adjacent vehicle is receding at speeds greater than that threshold, there is little or no likelihood of collision. Therefore, a warning tone is unnecessary. In addition, the device includes a vehicle speed sensor to prevent a warning tone from being generated when the host vehicle is travelling at speeds of less than ten miles per hour. This feature would prevent false alarms generated in heavy stop and go traffic and parallel parking when visual surveillance will suffice.

In general terms, the apparatus of the present invention comprises an ultrasonic transmitter and corresponding transducer, an ultrasonic receiver and corresponding transducer, a doppler shift detector, and related circuitry. An acoustic pulse is emitted from the transmitting transducer and coupled to the surrounding air. The ultrasonic energy is broadcast along a narrow prescribed path along the side of the host vehicle. Sound waves which are reflected from an obstructing vehicle are detected by a receiving transducer which is located in proximity to the transmitting transducer and processed by the ultrasonic receiver and doppler sensing circuitry.

An object of the invention is to warn the driver of vehicle as to the presence of another vehicle in his or her path when changing lanes.

Another object of the invention is to detect, using transmitted and reflected acoustic energy, objects or vehicles within a critical rearward distance when changing lanes.

Another object of the invention is to scan for obstructing vehicles when the driver's turn signals are activated.

Another object of the invention is to provide an audible indication of the relative speed and position of an obstructing vehicle.

Another object of the invention is to discriminate between fast and slow receding vehicles.

Another object of the invention is to prevent false indications of dangerous obstructions when the driver is travelling at low speeds.

Another object of the invention is to retrofit existing vehicles with minimal alterations.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIGS. 2A through 2C represent an exemplary schematic diagram corresponding to the block diagram of FIG. 1A and FIG. 1B.

DESCRIPTION OF THE PREFERRED EMBODIMENTS

Figure 1A:
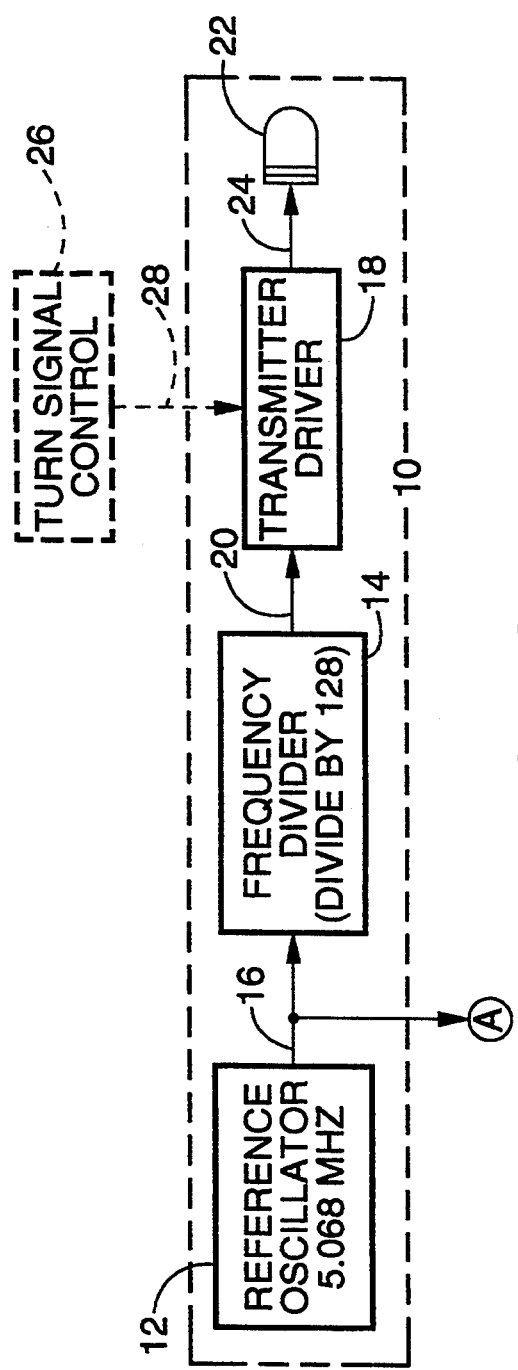
FIGS. 1A and 1B represent a functional block diagram of the present invention.
Figure 1B:
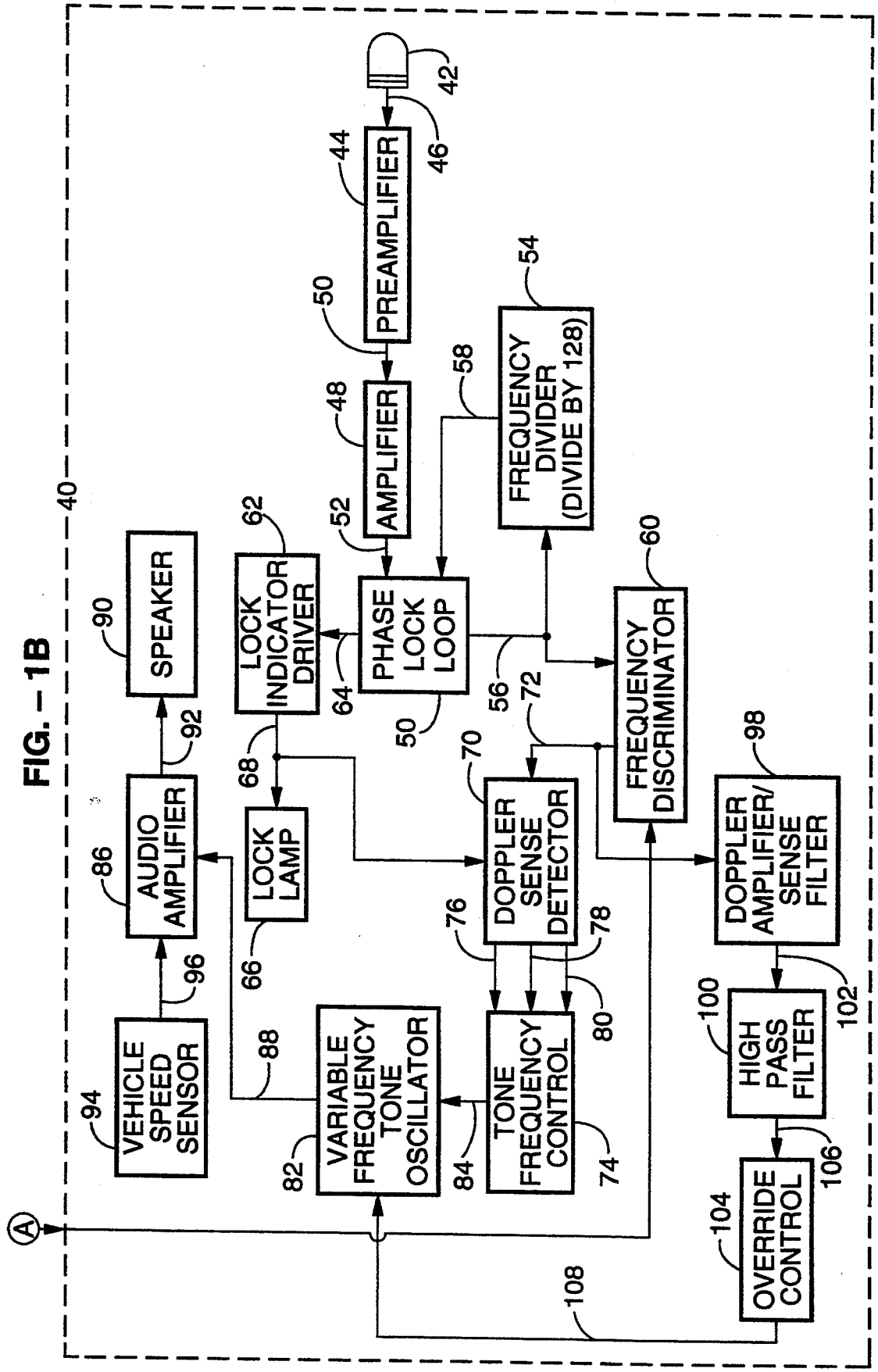

Referring more specifically to the drawings, for illustrative purposes the present invention is embodied in the apparatus which is represented in the block diagrams of FIG. 1A and FIG. 1B. It will be appreciated that the apparatus may vary as to configuration and as to details of the parts without departing from the basic concepts as disclosed herein.

Figure 2A:
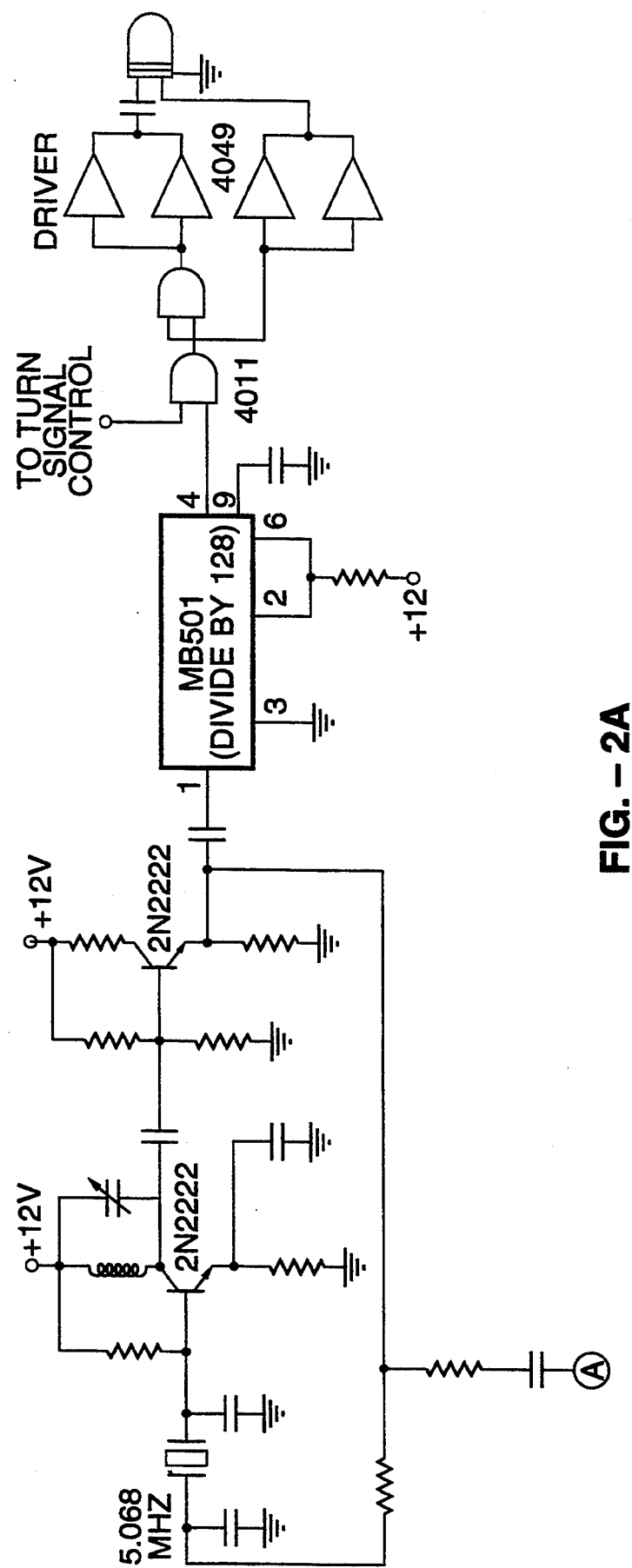

Referring to FIG. 1A, the present invention includes a transmitter 10 which emits an ultrasonic acoustic signal with an output frequency of approximately 39.6 kilohertz. A crystal controlled oscillator 12, having a conventional design as shown in FIG. 2A, is preferably used for frequency stability. Because the present invention will be used in connection with a vehicle which can be subjected to temperature extremes, temperature compensation circuitry can be employed if necessary to maintain frequency stability. In the preferred embodiment, oscillator 10 has an output frequency of 5.068 megahertz.

The output of oscillator 10 is routed to a frequency divider 14 through interconnection 16. Frequency divider 14 is typically an MB501 prescaler or equivalent which provides division of one-hundred and twenty-eight. This results in the output of frequency divider 14 being approximately 39.6 kilohertz for an oscillator frequency of approximately 5,068 megahertz.

The output of frequency divider 14 is routed to transmitter driver 18 through interconnection 20. Transmitter driver 18 comprises conventional digital circuitry as shown in FIG. 2A, and is used to drive transmit transducer 22 through interconnection 24. Transmit transducer 22 is a conventional piezoelectric ceramic transducer for ultrasonic output, and serves as a means for transmitting an ultrasonic signal. Transmitter driver 18 is also coupled to turn signal control 26 through interconnection 28. Note that turn signal control 26 does not comprise a portion of the present invention, but is found in the vehicle to which the present invention is coupled. The interconnection to turn signal control 26 is made so that transmitter 10 will be activated only when a turn signal in the vehicle is activated.

Referring now to FIG. 1B, the present invention also includes a receiver 40 for receiving ultrasonic signals. Receive transducer 42 is a conventional piezoelectric ceramic transducer which is the same or similar to transmit transducer 22, and is used as a means for receiving an ultrasonic signal. The output of receive transducer 42 is amplified by two stages of amplification. As a first stage of amplification, a preamplifier 44 is coupled to receive transducer 42 through interconnection 46. Preamplifier 44 is typically a 2N2222 or equivalent low noise transistor stage which amplifies the received signal to a level acceptable for further amplification. For a second stage of amplification, amplifier 48 is coupled to preamplifier 44 through interconnection 50. Amplifier 48 is typically an SK3477 or equivalent and amplifies the received signal to an acceptable level for detection.

The output of amplifier 48 is routed to a signal detector 50 through interconnection 52. Signal detector 50 is typically a 4046 phase lock loop or equivalent, and includes a phase lock detector, a voltage controlled oscillator (vco), and a filter. The vco output of signal detector 50 is coupled to the input of frequency divider 54 through interconnection 56. Frequency divider 54 is the same or similar to frequency divider 14. In the preferred embodiment, the vco frequency is approximately 5,068 megahertz. Therefore, frequency divider 54 will reduce the signal to approximately 39.6 kilohertz. The output of frequency divider 54 is coupled to an input of signal detector 50 through interconnection 58.

The phase lock output of signal detector 50 is coupled to a lock indicator driver 62 through interconnection 64. Lock indicator driver 62 produces a signal indicative of the presence of a received signal which is within a prespecified tolerance of the vco frequency of signal detector 50. Preferably, lock occurs when the received signal is within five kilohertz of the vco frequency. A lock indicator 66, which is a light emitting diode or the like, is coupled to lock indicator driver 62 through interconnection 68 to provide a visual indication that signal detector 50 has locked onto a received signal. The output of lock indicator driver 62 also serves to enable doppler sense detector 70, and is coupled to doppler sense detector 70 through interconnection 68.

Frequency discriminator 60 compares the frequency of the received signal with the frequency of the transmitted signal. Therefore, frequency discriminator 60 is coupled to the vco output of signal detector 50 through interconnection 56, as well as to the output of oscillator 12 through interconnection 16. Frequency discriminator 60, which is typically a 4044 phase lock loop or the like, produces a doppler sense signal indicative of the doppler component of the received signal. If the received signal is higher in frequency than the transmitted signal, then the doppler sense signal is a positive voltage which indicates that the obstacle or "target" is approaching. If the received signal is lower in frequency than the transmitted signal, then the doppler sense signal is a negative voltage which indicates that the obstacle is receding. If the transmitted and received signals are approximately the same in frequency within a bandwidth of approximately plus or minus five hertz, the output voltage is zero which indicates that the obstacle is moving at a constant speed in relation to the driver's vehicle.

Figure 2B:
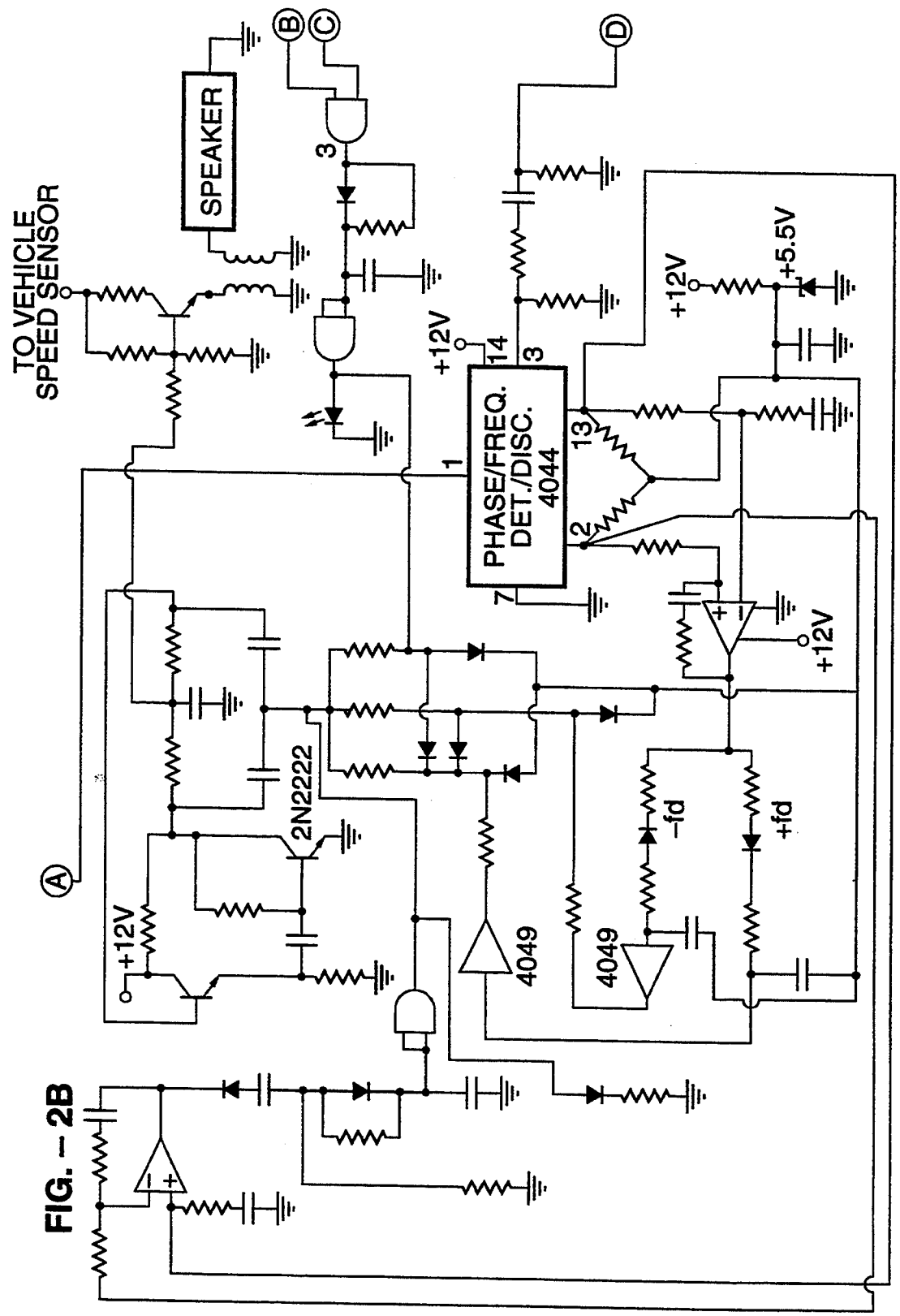

Doppler sense detector 70 is coupled to frequency discriminator 60 through interconnection 72. Doppler sense detector 70 provides the logic associated with determining the polarity of the doppler sense signal and outputting a tone control signal on the appropriate output line to tone frequency control 74. If the doppler sense signal is positive, a tone control signal is output on interconnection 76; if negative, a tone control signal is output on interconnection 78; and, if zero, a tone control signal is output on interconnection 80. Tone frequency control 74 is interconnected to a variable frequency tone oscillator 82 through interconnection 84. Variable frequency tone oscillator 82 generates a 1200 hertz tone if the doppler sense signal is positive, an 800 hertz tone if the doppler sense signal is negative, and a 1000 hertz tone if the doppler sense signal is zero. The tone is then amplified by audio amplifier 86 which is coupled to variable frequency tone oscillator 82 through interconnection 88. Audible indication of each tone is provided over speaker 90 which is coupled to audio amplifier 86 through interconnection 92. Variable frequency tone oscillator 82 is typically a "twin-tee" oscillator or equivalent as shown in FIG. 2B, with its output frequency selected by switching a specified resistor through a diode steering circuit. Note also that, in order for a tone to be generated, doppler sense detector 70 must receive an enable signal from lock indicator driver 62.

As a means to prevent warning tones from being generated from parked cars, pedestrians, and the like when moving at slow speeds, the device includes a vehicle speed sensor 94 which is coupled to audio amplifier 86 through interconnection 96. Vehicle speed sensor 94 can be any speed sensing device which coupled to the vehicle to sense vehicle speed. Typically a mechanical or electronic tachometer-type control is employed to switch power to audio amplifier 86 when a specified speed is achieved. Preferably, vehicle speed sensor 94 disables audio amplifier 86 at speeds below ten miles per hour, but can be set to disable audio amplifier 86 below any predetermined speed.

As indicated previously, a doppler sense signal having a negative polarity is indicative of an adjacent vehicle receding in relation to the vehicle in which the present invention is employed. Such a relationship constitutes a low collision threat condition, and the speed at which the adjacent vehicle is receding will have an impact on the degree of threat posed. When the speed of recession exceeds five miles per hour, a threat of collision is essentially non-existent at typical driving speeds. Therefore, the device includes warning override means to prevent a warning tone from being generated at recession speeds in excess of five miles per hour, or at any other recession speed which is greater than a predetermined threshold. Doppler sense signals generated by frequency discriminator 60 are amplified by doppler amplifier/sense filter 98 which is coupled to frequency discriminator 60 through interconnection 72. Doppler amplifier/sense filter 98 also detects the polarity of the doppler sense signals and permits signals having only a negative polarity to pass. A high pass filter 100 is coupled to doppler amplifier/sense filter 98 through interconnection 102. High pass filter 100 is a conventional R-C filter with its elements set to pass only those negative doppler sense signals corresponding to speeds of recession in excess of five miles per hour (or another desired speed). An override control 104, which has its input coupled to coupled to high pass filter 100 through interconnection 106 and its output coupled to variable frequency tone oscillator 82 through interconnection 108, generates a switching signal responsive to the negative doppler sense signal to prevent variable frequency tone oscillator 82 from operating.

A typical embodiment of the present invention can be seen in schematic form in FIGS. 2A through 2C which combines analog and digital circuit elements. Those skilled in the art will appreciate that alternative circuitry could be employed to implement the functional block elements shown in FIG. 1A and FIG. 1B without departing from the scope of the invention disclosed herein.

Figure 3:
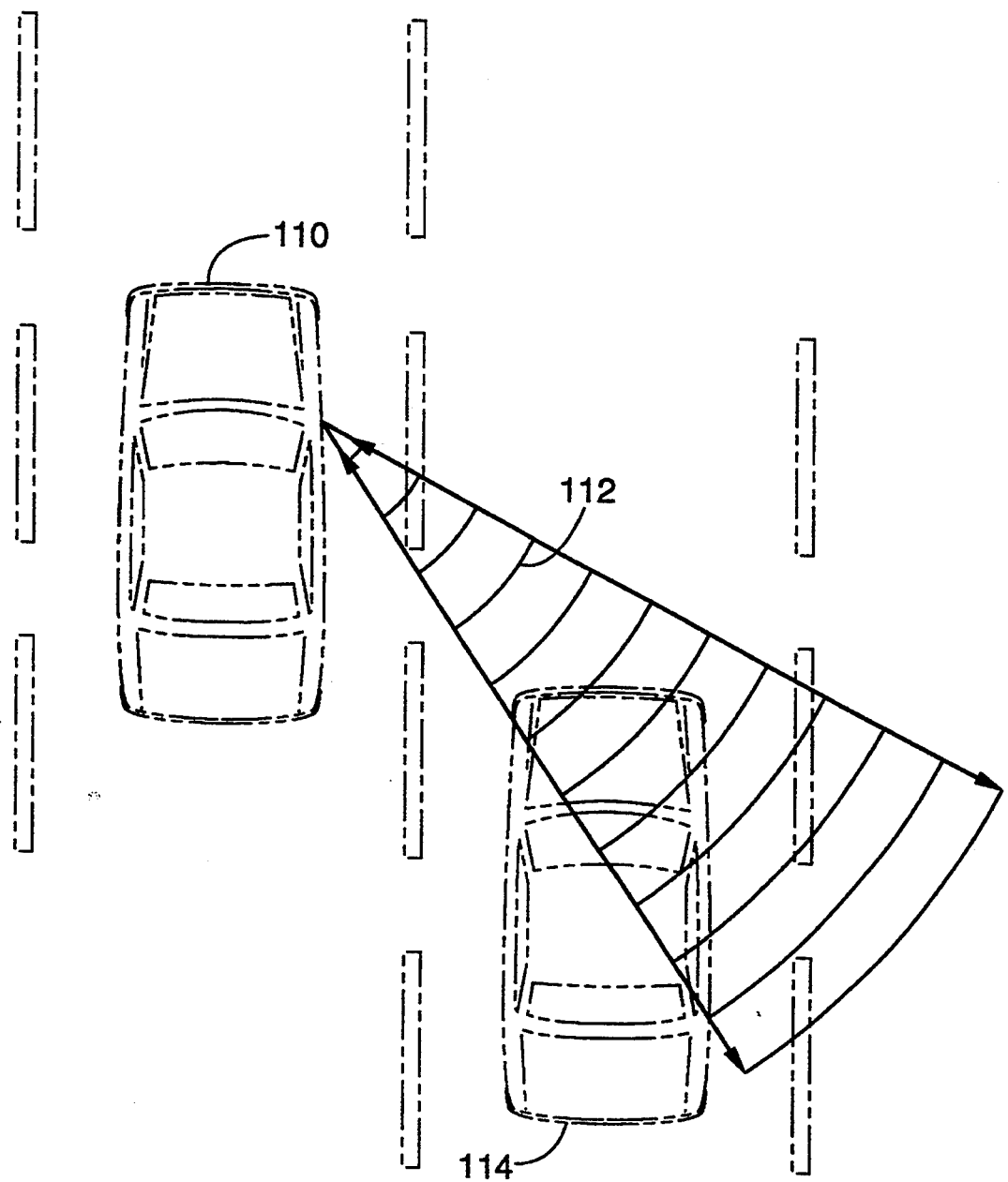
FIG. 3 is diagrammatic plan view of a vehicle equipped with the present invention detecting the presence of an adjacent vehicle.

Referring now to FIG. 3, the present invention would typically be employed in a host vehicle 110. Transmit transducer 22 and receive transducer 42 would be mounted on the side of the vehicle at a position approximately one-third of the distance from the front to the rear of the vehicle. The exact placement can be varied, depending upon the zone of view and amount of advance warning which is desired. And, while it should be sufficient to install one unit on the right side of the vehicle to provide efficient blind spot obstacle detection, identical units could be installed on both sides of the vehicle. However, transmit transducer 22 and receive transducer 44 should be spaced apart to eliminate spurious interference.

When the driver of host vehicle 110 activates the turn signals in the vehicle, turn signal control 26 will activate transmitter 10. It should be noted that, while turn signal control 26 is coupled to transmitter driver 18 so as to enable signal transmission, oscillator 12 runs continuously for stability. At the same time that transmitter 10 is activated, receiver 40 is activated. While transmitter 10 and receiver 40 could be left in operation continuously, such continuous operation would increase the likelihood of false alarm indications when the turn signals have not been activated.

Once activated, transmitter 10 will emit a transmitted signal 112 having a beam pattern with a width of approximately 45 degrees. This is controlled by the characteristics of transmit transducer 22. When transmitted signal 112 strikes an adjacent vehicle 114 which is in a position to constitute an obstacle, a reflection of transmitted signal 112 will be directed back to host vehicle 110. The frequency of the reflected signal, however, will be shifted depending upon the speed of adjacent vehicle 114 in relation to host vehicle 110. The amount of the frequency shift or "doppler effect" can be found from the following equation:

$$F_d = F_t(c+v)/(c-v) - F_t$$

where:
 $F_d$ is the doppler frequency;
 $F_t$ is the transmitted frequency;
 v is the velocity of adjacent vehicle 102; and
 c is the speed of light.

As discussed above, the transmitted signal typically has an output frequency of approximately 39.6 kilohertz. In addition, there will be a certain amount of variation in the signal which is referred to as $f_e$. Because of the use of frequency divider 14 in a divide by one hundred and twenty-eight mode, we can represent the output of oscillator 12 as 5.068 Mhz$\pm$128 $f_e$. This means that the transmitted signal will have a frequency of 39.6 Khz$\pm f_e$. Therefore, the doppler shifted received will have a frequency of 39.6 Khz$\pm f_e \pm f_d$.

In the embodiment described herein, the vco of signal detector 50 is set to run at a frequency of approximately 5,068 Mhz. This signal is divided by frequency divider 54 to approximately 39.6 Khz for comparison with the received signal and, if the two signals are within approximately 5 Khz of each other, a lock will occur. When a lock occurs, the vco signal will have frequency of 5,068 Mhz$\pm$128 $f_e\pm$128 $f_d$ if the received signal has been doppler shifted.

The vco output signal of signal detector 50 is injected into frequency discriminator 60 as is the output signal of oscillator 12. There, the two signals are compared and result is a doppler sense signal$\pm f_d$. For purposes of the present invention, the "sense" or polarity is used to determine if adjacent vehicle 114 is approaching or receding from host vehicle 110. Alternatively, if the doppler sense signal is zero, then the relative speeds of host vehicle 110 and adjacent vehicle 114 are the same. It should be noted that, while the polarity of the sense signal is used to generate a tone, the value of the sense signal could be used to determine the speed of adjacent vehicle 114. Such information could be presented to the driver of host vehicle 110 in the form of a visual display.

Accordingly, it will be seen that this invention provides an efficient and effective system to alert of driver of potential danger from adjacent vehicles while changing lanes. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:
1. An apparatus for alerting the driver of a vehicle to the presence of an adjacent vehicle while changing lanes, comprising:
 (a) transmitting means for transmitting a first signal, said transmitting means operatively responsive to a turn signal activation control in said vehicle;
 (b) receiving means for receiving a second signal, said second signal representing a reflection of said first signal;
 (c) signal detecting means for detecting presence of said second signal, said signal detecting means coupled to said receiving means;
 (d) frequency discriminating means for determining a frequency differential between said second signal and said first signal and producing a doppler sense signal indicative of said frequency differential, said frequency discriminating means coupled to said signal detecting means;
 (e) doppler sense means for sensing polarity of said doppler sense signal; and
 (f) tone generating means for generating a first audible tone indicative of a positive frequency differential, a second audible tone indicative of a negative frequency differential, and a third audible tone indicative of said first signal and said second signal having a substantially identical frequency, said tone generating means operatively responsive to said doppler sense means.

2. An apparatus as recited in claim 1, wherein said transmitting means comprises an ultrasonic transducer having an output frequency of approximately 39.6 kilohertz.

3. An apparatus as recited in claim 2, wherein said receiving means comprises an ultrasonic transducer capable of receiving a signal having a frequency of approximately 39.6 kilohertz.

4. An apparatus as recited in claim 1, further comprising speed sensing means for sensing speed of said vehicle and preventing generation of said first, second and third audible tones when said vehicle is operated below a predetermined speed.

5. An apparatus as recited in claim 1, further comprising override control means for preventing generation of said audible tones when a negative frequency differential between said second signal and said first signal exceeds a predetermined threshold.

6. A vehicular blind spot detection apparatus, comprising:
 (a) a transmitter, said transmitter including means for generating a transmitted signal having an ultrasonic output frequency, said transmitter operatively responsive to operation of a turn signal control in a vehicle;
 (b) an ultrasonic receiver, said receiver including signal detecting means for locking onto a received signal having a frequency within a specified tolerance of said output frequency of said transmitter and generating a lock signal indicative thereof, said receiver including frequency discriminating means for determining a frequency differential between said received signal and said transmitted signal and producing a doppler sense signal indicative of said frequency differential;
 (c) doppler sense means for sensing polarity of said doppler sense signal; and
 (d) a tone generator, said tone generator including means for generating a first audible tone indicative of a positive frequency differential, means for generating a second audible tone indicative of a negative frequency differential, and means for generating a third audible tone indicative of said received signal and said transmitted signal having a substantially identical frequency, said tone generator operatively responsive to said doppler sense means.

7. An apparatus as recited in claim 6, wherein said ultrasonic transmitter includes:
 (a) an oscillator, said oscillator operating at an output frequency of approximately 5,068 megahertz;
 (b) a frequency divider, said frequency divider coupled to said oscillator, said frequency divider having an output frequency of approximately 39.6 kilohertz;
 (c) a transducer driver, said transducer driver coupled to said frequency divider; and
 (d) a first ultrasonic transducer, said first ultrasonic transducer coupled to said transducer driver.

8. An apparatus as recited in claim 7, wherein said ultrasonic receiver includes a second ultrasonic transducer and an amplifier, said amplifier coupled to said second ultrasonic transducer, and wherein said signal detecting means includes a phase lock loop, said phase lock loop coupled to said amplifier, said phase lock loop operating at a frequency of approximately 39.6 kilohertz.

9. An apparatus as recited in claim 8, further comprising speed sensing means for sensing speed of said vehicle and preventing generation of said first, second and third audible tones when said vehicle is operated below a predetermined speed.

10. An apparatus as recited in claim 9, further comprising override control means for preventing generation of said audible tones when a negative frequency differential between said second signal and said first signal exceeds a predetermined threshold.

11. An apparatus as recited in claim 6, further comprising override control means for preventing generation of said audible tones when said negative frequency differential exceeds a predetermined threshold.

12. A method for detecting an obstacle in the path of a vehicle while changing lanes, comprising the steps of:
 (a) transmitting a first signal in response to operation of a turn signal activation control in said vehicle;
 (b) receiving a second signal, said second signal comprising a reflection of said first signal from an obstacle;
 (c) detecting the presence of said second signal;
 (d) determining a frequency differential between said second signal and said first signal;
 (e) generating a first audible tone indicative of a positive frequency differential;
 (f) generating a second audible tone indicative of a negative frequency differential; and
 (g) generating a third audible tone indicative of said first signal and said second signal having a substantially identical frequency.

13. A method as recited in claim 12, further comprising the steps of:
 (a) sensing speed of said vehicle; and
 (b) preventing generation of said first, second and third audible tones when said vehicle is operated below a predetermined speed.

14. A method as recited in claim 12, further comprising the steps of:
 (a) determining the negative frequency differential between said second signal and said first signal; and
 (b) preventing generation of said first, second and third audible tones when said negative frequency differential exceeds a predetermined threshold.

* * * * *